United States Patent

Haese

[11] 4,229,419
[45] Oct. 21, 1980

[54] TUBE REACTOR FOR ENDOTHERMIC GAS REACTIONS

[75] Inventor: Egon Haese, Bochum, Fed. Rep. of Germany

[73] Assignee: Dr. C. Otto & Comp. G.m.b.H., Bochum, Fed. Rep. of Germany

[21] Appl. No.: 856,705

[22] Filed: Dec. 2, 1977

[30] Foreign Application Priority Data

Dec. 15, 1976 [DE] Fed. Rep. of Germany ....... 2656726

[51] Int. Cl.² .............................. B01J 8/00; B01J 3/04
[52] U.S. Cl. .................................... 422/197; 422/202; 422/208; 422/211; 422/312
[58] Field of Search ..................... 23/290, 289, 288 K, 23/288 M; 165/142; 122/32; 422/198, 200, 201, 208, 312, 211, 197, 202

[56] References Cited

U.S. PATENT DOCUMENTS

| | | | |
|---|---|---|---|
| 2,145,877 | 2/1939 | Houdry | 23/288 K |
| 3,899,420 | 8/1975 | Nozawa et al. | 23/288 M X |
| 3,980,440 | 9/1976 | Morse et al. | 23/288 M |

Primary Examiner—Joseph Scovronek
Assistant Examiner—Chris P. Konkol
Attorney, Agent, or Firm—Thomas H. Murray; Clifford A. Poff

[57] ABSTRACT

A noble gas after heating in a nuclear reactor is passed through a tube-type reactor to carry out endothermic chemical reactions with a gas. The tube-type reactor includes reactor tube assemblies in a bundle formation supported by a mounting plate. A cover tube surrounds the upper portion of each reactor tube assembly. The cover tubes extend from the bottom surface of the mounting plate to a point slightly above the noble gas discharge opening in the pressure jacket of the reactor. The lower end portions of each cover tube include a reinforced member to seal the interspaces between the cover tubes and to seal the space between the cover tubes and the wall of the pressure jacket. Above the mounting plate are sealing containers including end members having edge flanges that are welded together to form a seal between the top side of the mounting plate and the reactor tube assemblies.

5 Claims, 7 Drawing Figures

TUBE REACTOR FOR ENDOTHERMIC GAS REACTIONS

BACKGROUND OF THE INVENTION

This invention relates to a tube-type reactor for carrying out endothermic chemical reactions with a gas by employing the thermal energy supplied by a hot pressurized gas, more particularly a noble gas, which is heated to a required temperature in a nuclear reactor.

One known form of a tube-type reactor comprises a bundle of vertical tube assemblies arranged within an internally-insulated pressure jacket. Each tube assembly includes a reactor tube, filled with a catalyst if required, and a concentrically-arranged cover tube which surrounds the reactor tube and forms an annular gap therebetween. A heat-yielding gas flows upwardly through this annular gap. The top portions of the cover tubes are collected together in mutual contact to form a bundle. An equilateral triangle is formed by imaginary lines extending between the center points of three tubes in mutual contact. The cover tubes have six slots uniformly distributed about their periphery to receive connecting elements that are secured by welding to permanently interconnect the cover tubes, thus forming a mounting plate assembly. The arrangement of parts is such that a minimum separation distance between the tubes is achieved to minimize the diameter of the bundle. When a tube-type reactor of this known form is placed in operation, the hot noble gas flows through the annular space between the cover tubes and the reactor tubes, whereby the gas also flows through the mounting plate assembly. Consequently, the mounting plate assembly is heated to a temperature corresponding to the temperature of the noble gas leaving the endothermic reaction region in the tube-type reactor. Therefore, the temperature of the noble gas should not exceed the temperature range of 650° C. to 700° C. to avoid weakening of the reactor components.

Recently, because of changes to the endothermic gas reaction process, a higher temperature of the noble gas discharged from the reaction region in the tubular reactor is required, namely, a temperature up to 800° C. and even up to 850° C. Under these conditions, the noble gas discharged from the reaction region in the tube-type reactor must be withdrawn from the reactor below the mounting plate assembly and the upper ends of the reactor tubes must be sealed in a gas-tight manner to the mounting plate assembly.

In another form of a known tube-type reactor, the reactor tube assemblies are mounted within bored openings formed in solid plates. The plates are insulated at their face surfaces which are directed toward the hot noble gas. In a further known form of a tube-type reactor, a double-mounting plate arrangement is used to form a cavity between the plates. A cold gas is passed through this cavity. However, it is a very difficult undertaking to effectively insulate the underside of the plate. Moreover, the risk of damage to insulation may easily occur during repair operations. The use of a double-mounting plate arrangement has the further disadvantage that undesirable thermal stresses occur in the plates.

SUMMARY OF THE INVENTION

It is an object of the present invention to provide an improved construction and arrangement of parts for a tube-type reactor to maintain a mounting plate structure for reactor tubes therein at a sufficiently low temperature without incurring the disadvantages described hereinbefore inherent in the construction of known tube-type reactors.

The present invention is, therefore, addressed to a tube-type reactor receiving a pressurized noble gas at a temperature within the range of approximately 600° C. and 1000° C. after heating in a nuclear reactor for carrying out an endothermic chemical reaction with a gas, the tubular reactor including a pressure jacket with internal insulation, reactor tube assemblies, containing a catalyst when required, extending vertically within the pressure jacket, mounting plate means permanently secured to the top end portions of the reactor for support by the upper part of the pressure jacket, noble gas feed means to introduce pressurized noble gas into the bottom portion of the pressure jacket and noble gas discharge means in the upper part of the pressure jacket below the mounting plate means for discharging the noble gas from the pressure jacket, the combination therewith of the improvement comprising cover tubes each surrounding a portion of one of the reactor tube assemblies, each cover tube extending within the space between the bottom surface of the mounting plate and a point in elevation which is slightly above the noble gas discharge means, a reinforced member extending from the lower end portion of each cover tube to seal the space between the cover tubes and to seal the space between the cover tubes and the inner wall of the pressure jacket, and sealing containers including end members to form a seal between the top side of the mounting plate means and the reactor tube assemblies.

A tube-type reactor embodying this construction of parts insures that when the reactor is in operation, the temperature of the mounting plate structure does not exceed 600° C. to 650° C. even when the noble gas discharged from the reactor has a temperature up to 800° C. and even up to 850° C.

According to one embodiment of the present invention, the aforesaid mounting plate means includes a solid plate formed with bores for receiving the reactor tube assemblies. In a further and preferred embodiment of the present invention, the mounting plate means comprises tubes secured together into a bundle formation with at least a top portion of the tubes in mutual contact. The top ends of each tube includes six longitudinal slots uniformly distributed about the periphery of the tube for receiving connecting elements. The connecting elements have a height which is approximately the same as the length of the slots. The connecting elements are permanently secured by welding to the tubes.

In the preferred form of the present invention, reinforced closure members at the lower ends of the cover tubes are employed to limit the flow of noble gas beyond the cover tubes in the pressure jacket. Each reinforced closure member is welded to only one cover tube to accommodate a differential longitudinal thermal expansion by the tubes.

In the preferred form of the present invention, the aforesaid sealing containers and end members are interconnected at peripheral web surfaces by weld metal to form a honeycomb-shaped seal assembly. This construction provides the advantage that in the event the reactor tubes are to be replaced, then the weld metal is readily removable by grinding operations. A reactor tube, together with a sealing container, is then removed as a unit from the tube-type reactor and a replacement unit is inserted into the bundle. A seal of weld metal is then easily produced within the tube-type reactor without hindrance.

These features and advantages of the present invention as well as others will be more readily understood when the following description is read in light of the accompanying drawings, in which.

Figure 1:
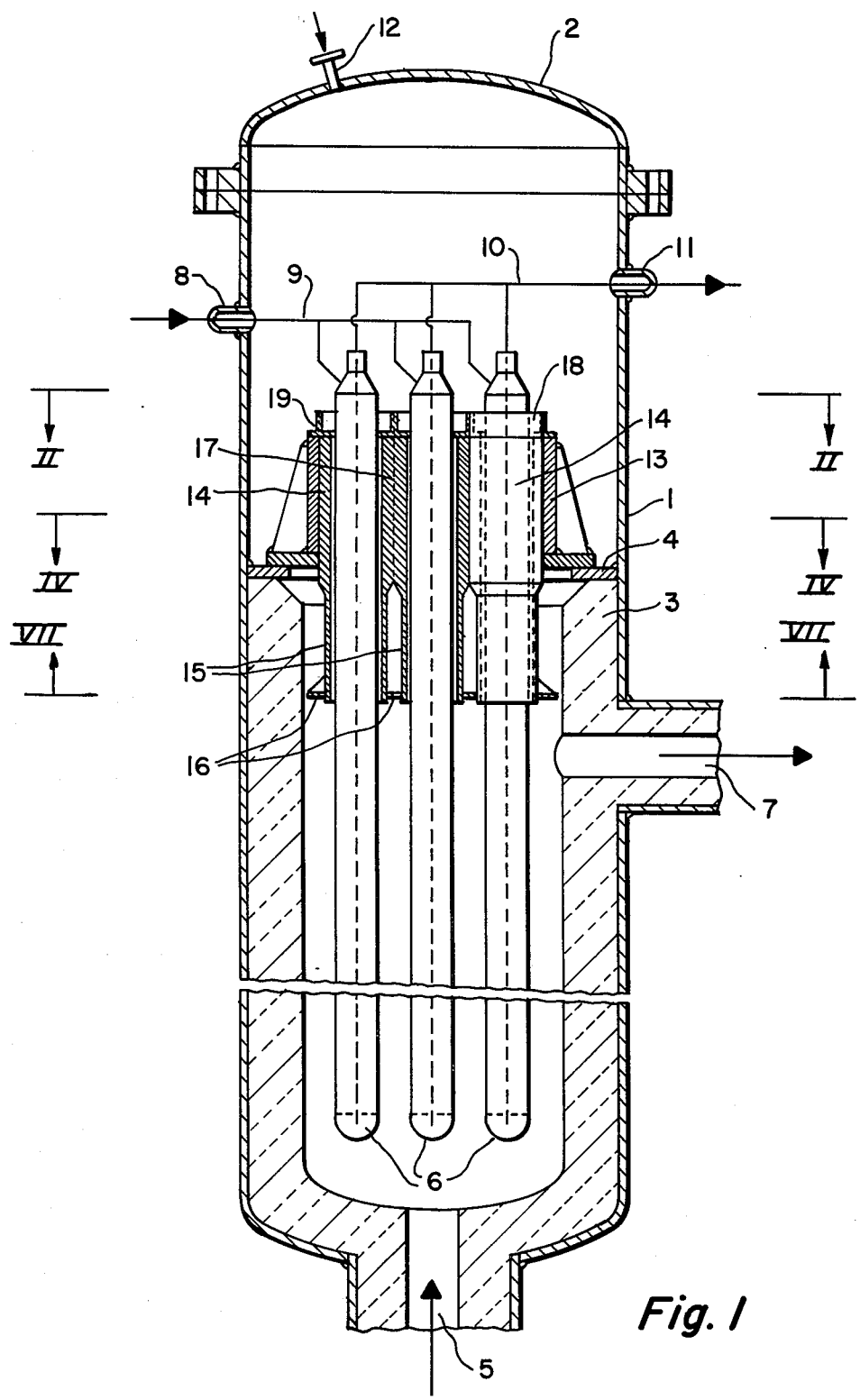
FIG. 1 is an elevational view, in cross section, through a tube-type reactor embodying the features according to one embodiment of the present invention.
Figure 5:
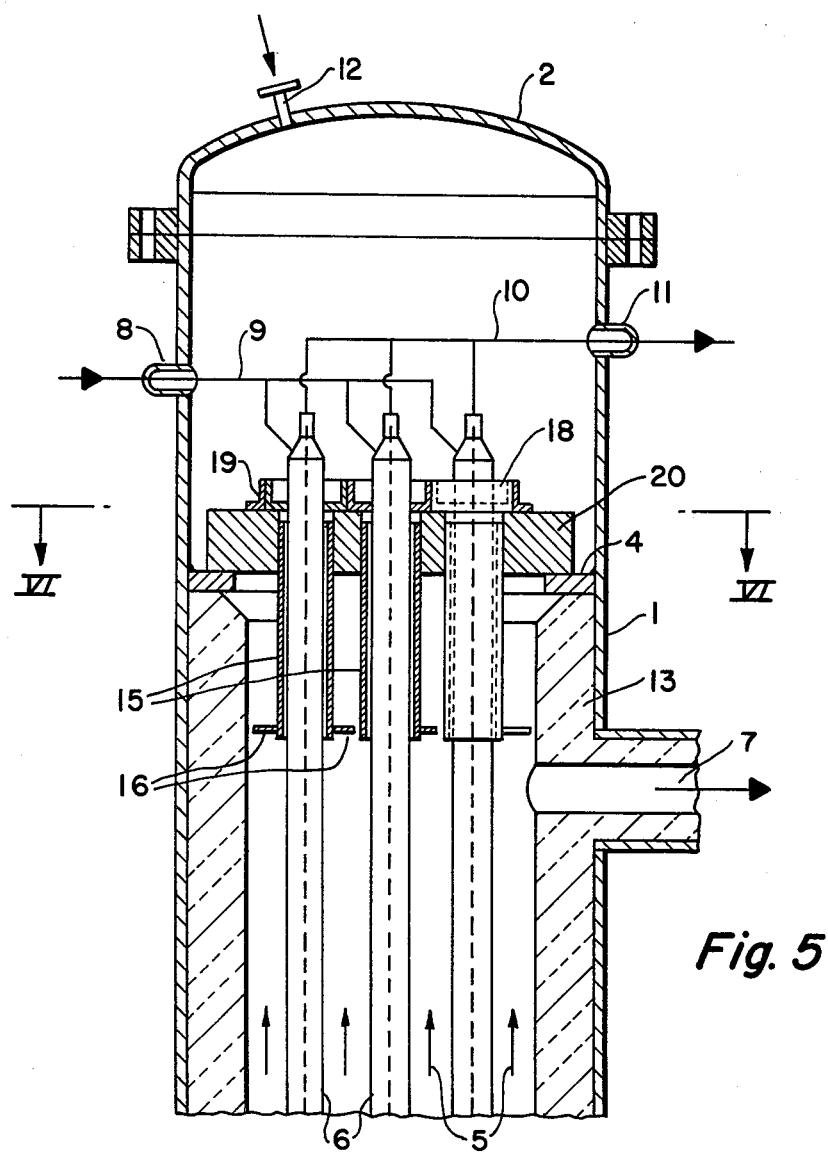
FIG. 5 is an elevational view, in cross section, through a tube-type reactor embodying the features according to a second embodiment of the present invention.

In each of the two embodiments shown in FIGS. 1 and 5, a tube-type reactor includes a pressure jacket 1 with a flanged upper end secured by bolts to the flange of a hood 2. The bottom part of the reactor contains a layer of insulation 3 extending to the bottom surface of a ring 4 within the upper part of the jacket. The ring 4 supports a mounting plate assembly for reactor tube assemblies. A nozzle 5 delivers a heated noble gas, e.g., helium, at a temperture of 900° C.-1000° C. into the tube-type reactor after the gas is heated in a nuclear reactor. The heated noble gas contacts the heat-receiving tubes of reactor tube assemblies 6. The gas flows from the lower ends of the tube assemblies along a substantial part of their lengths. The gas flows upwardly within the pressure jacket to a point where the gas is discharged through a nozzle 7 at a temperature within the range of about 800° C.-850° C.

A gaseous reaction mixture is conducted through a nozzle 8 is the pressure jacket by a line 9 to the upper parts of the tube assemblies 6. The reacted gaseous mixture is discharged from the reactor by line 10 through a nozzle 11 in the pressure jacket. A nozzle 12 in hood 2 delivers fresh helium into the space above the mounting plate assembly within the reactor. The helium in the space above the mounting plate assembly is maintained at a pressure which is slightly greater than the pressure of the heated helium flowing within the reactor below the mounting plate assembly. This pressure differential prevents the highly-heated helium which is contaminated from flowing through leakage openings into the space above the mounting plate assembly. This feature provides an important advantage during repairing operations on the tube-type reactor.

In the embodiment of the present invention shown in FIGS. 1-4, the mounting plate assembly comprises a bearing ring 13 having a horizontal flange used to support the assembly on ring 4. The bearing ring 13 surrounds jacket tube portions 14 which are arranged into a bundle formation. Each cover tube 15 is welded in an end-to-end relation onto the bottom of a jacket tube portion 14. The cover tubes 15 have a length which is selected so that their lower ends terminate in the pressure jacket at an elevation which is slightly above the outlet nozzle 7. The cover tubes 15 and the jacket tube portions 14 have the same internal diameter but the cover tubes 15 have a smaller external diameter than the external diameter of the jacket tube portions 14.

Figure 7:
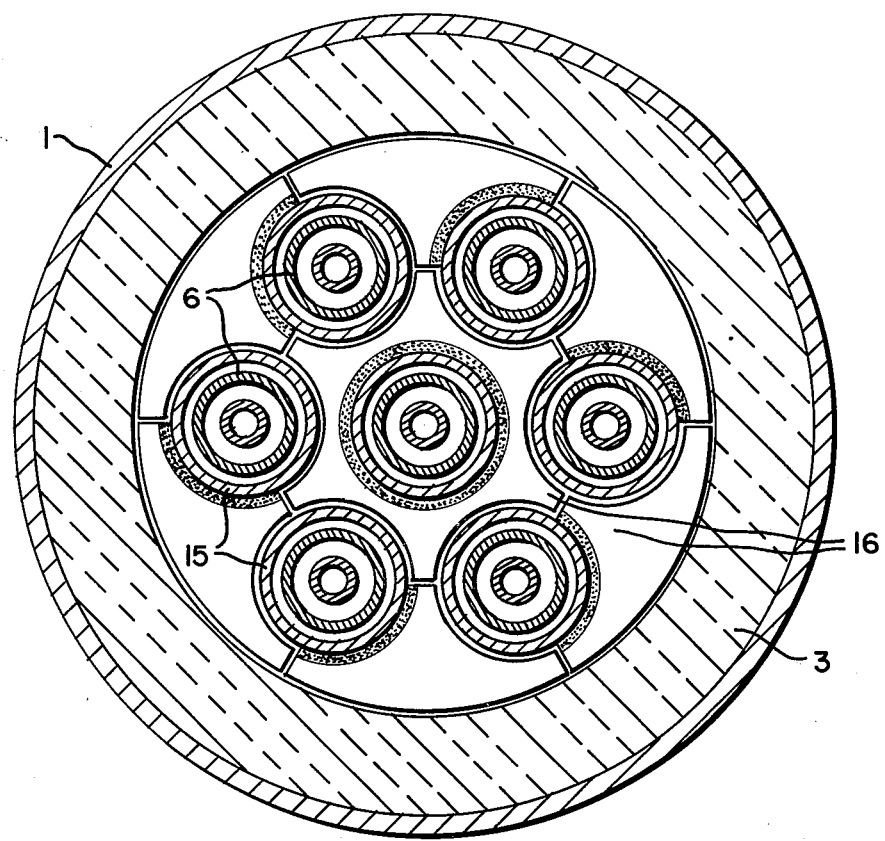
FIG. 7 is a sectional view taken along line VII—VII of FIG. 1.

As shown in FIGS. 1 and 7, the internal diameters of jacket tube portions 14 and the cover tubes 15 are the same as just described but selected so that the reactor tube assemblies can be easily passed into and withdrawn from the tubes 14 and 15. A clearance of between 2-5 millimeters is sufficient between each reactor tube assembly and tubes 14 and 15 after welding together. The space in the pressure jacket above the outer walls of tubes 15 is sealed by closure members 16, e.g., walls extending radially of the tubes, with welded gussets on the bottom ends of these tubes. Each closure member with the welded gussets is attached to only one cover tube to allow for a differential thermal expansion between the lower ends of tubes 15. The lower seal provided by the closure member 16 is used to limit the flow of helium at a temperature of 800° C.-850° C. beyond the seal.

Figure 4:
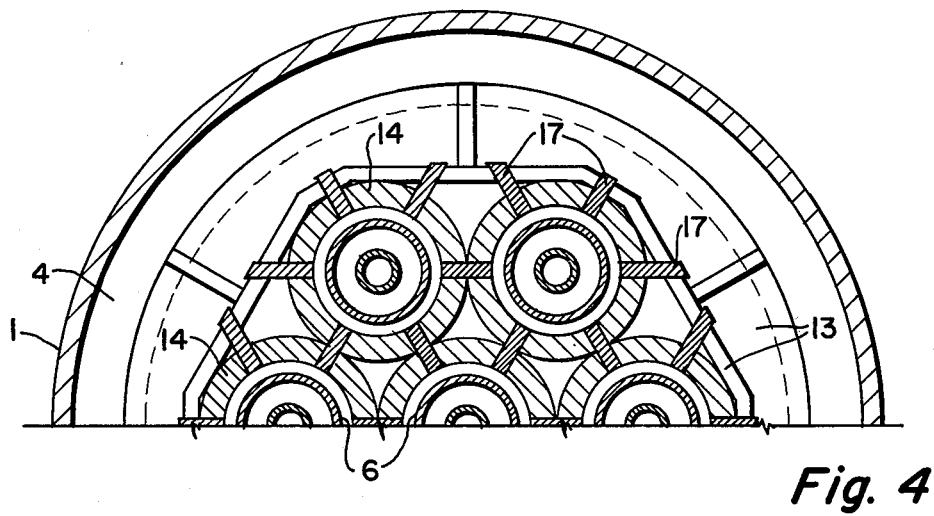
FIG. 4 is a sectional view taken along line IV—IV of FIG. 1.

The upper peripheral end of each jacket tube portion 14 has six, uniformly-spaced longitudinal slots for receiving connecting elements 17. As shown in FIG. 4, the connecting elements are inserted and secured in the slots by weld metal. Connecting elements 17 are used to interconnect bearing 13 with the jacket tube portions located about the outer periphery of the bundle thereof.

Figure 2:
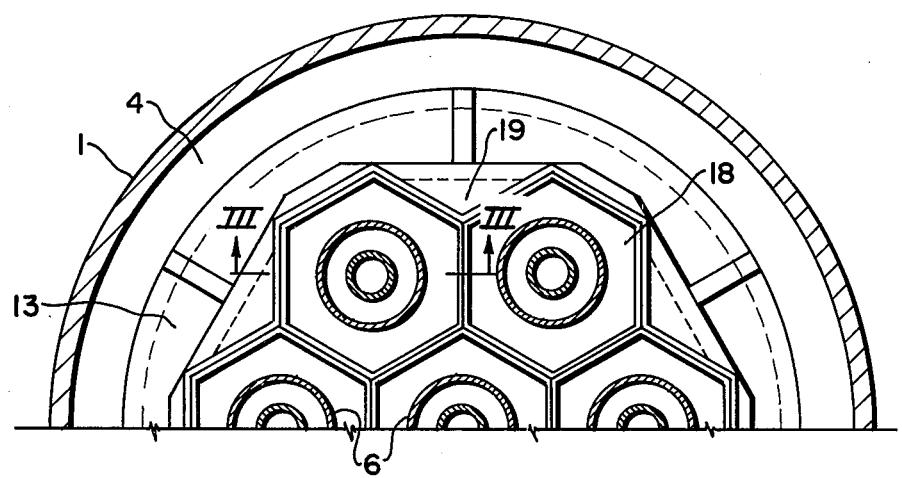
FIG. 2 is a sectional view taken along line II—II of FIG. 1.
Figure 3:
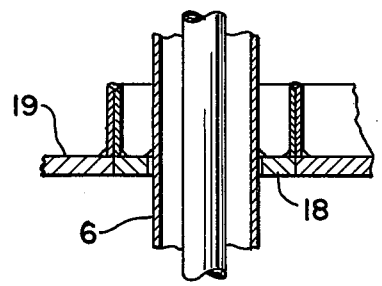
FIG. 3 is a sectional view taken along line III—III of FIG. 2.

As shown in FIGS. 1-3, a gas-tight seal is provided above the mounting plate assembly. This seal includes sealing containers 18 each of which is welded to one tube assembly 6. The outer peripheral edges of the sealing containers are provided with upstanding edge portions by which abutting sealing containers are secured to one another by weld metal, thus forming a honeycomb-like weldment assembly. End members 19 are welded to the outer sealing containers in the bundle formation by end seams to form a common sealing plate assembly which is welded to the bearing ring 13 to thereby provide an outer seal.

Figure 6:
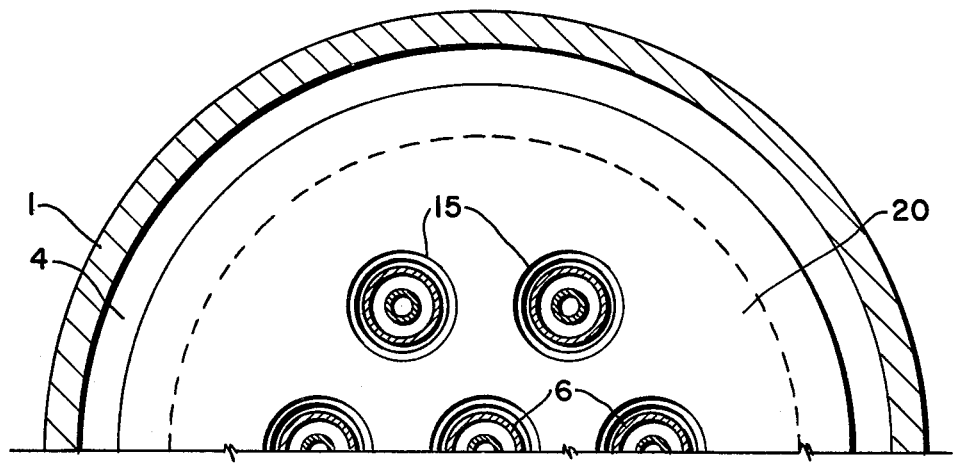
FIG. 6 is a sectional view taken along line VI—VI of FIG. 5.

FIGS. 5 and 6 illustrate an embodiment of the present invention which differs from that already described in regard to FIGS. 1-4 with respect to the form of mounting plate assembly used to support the reactor tube assemblies 6. In view of this, the same reference numerals have been applied to like elements in both embodiments and the above description applies with equal effect.

In FIGS. 5 and 6, the reactor tube assemblies are supported by a mounting plate 20. The tube assemblies extend through bored holes in the mounting plate. The cover tubes 15 in this embodiment each has a length so as to extend from the point slightly above the outlet nozzle 7 into a bored hole in the mounting plate 20. The cover tubes are welded to the mounting plate from above the plate about the upper peripheral edges of the cover tubes. The sealing containers 18 and end members 19 as well as the lower closure members 16 are disposed in the same manner as shown and described in regard to FIGS. 1-4.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a tube-type reactor receiving a pressurized noble gas at a temperature within the range of approximately 600° C. and 1000° C. after heating in a nuclear reactor for carrying out an endothermic chemical reaction with a gas, said tube-type reactor including a pressure jacket with internal insulation, reactor tube assemblies, containing a catalyst when required, extending vertically within said pressure jacket, mounting plate means permanently secured to top end portions of said reactor for support by the upper part of said pressure jacket, noble gas feed means to introduce said pressurized noble gas into the bottom portion of said pressure jacket, and noble gas discharge means in the upper part of said pressure jacket below said mounting means for discharging the noble gas from the pressure jacket, the combination therewith of the improvement comprising cover tubes each surrounding a portion of one of said reactor tube assemblies, each cover tube extending within the space between the bottom surface of said mounting plate means and a point in elevation which is slightly above said noble gas discharge means, a reinforced closure member extending only from the lower end portion of each cover tube to limit the flow of noble gas beyond the closure members into the space above the closure members between the cover tubes and the inner wall of said pressure jacket while allowing the flow of noble gas between said feed means and discharge means, and sealing container means including end members supported by said mounting plate means to form a gas-tight seal between the top side of said mounting plate means and said reactor tube assemblies.

2. The combination according to claim 1 wherein said mounting plate means includes a solid plate having bores therein for receiving said reactor tube assemblies.

3. The combination according to claim 1 wherein said mounting plate means includes jacket tubes arranged in a bundle formation with the top portion of one jacket tube in mutual contact with a different jacket tube, each of said cover tubes being joined in an end-to-end relation to the bottom of one of said jacket tubes for surrounding a portion of one of said reactor tube assemblies, each jacket tube having six longitudinal slots uniformly located about the circumference thereof, and connecting elements each having a height corresponding to the length of a longitudinal slot in a jacket tube for securing together mutual contacting jacket tubes by weld metal.

4. The combination according to claim 1 wherein said reinforced closure member includes a wall welded onto the lower end of only one cover tube to project outwardly therefrom, and gusset means to reinforce said wall.

5. The combination according to claim 1 wherein said sealing container means, each of which is sealed to one tube assembly, include outer peripheral edges with upstanding edge portions for welding to form a honeycomb-like weldment assembly.

* * * * *